United States Patent [19]
Decker et al.

[11] Patent Number: 5,224,748
[45] Date of Patent: Jul. 6, 1993

[54] MOTOR VEHICLE SECURITY SHADE WITH GUIDE TRACK

[75] Inventors: John H. Decker, Livonia; Joseph P. Wieczorek, Madison Heights; Joseph R. Finn, Rochester Hills; Eugnee M. Halajian, Mt. Clemons, all of Mich.

[73] Assignee: Takata, Inc., Auburn Hills, Mich.

[21] Appl. No.: 864,575

[22] Filed: Apr. 7, 1992

[51] Int. Cl.$^5$ .............................................. B60R 5/04
[52] U.S. Cl. ................................................... 296/37.16
[58] Field of Search ........................... 296/37.16, 37.8; 160/120, 121.1, 266, 267 R, 267 G, 268 R, 268 S, 269, 270, 273 R

[56] References Cited

U.S. PATENT DOCUMENTS

| | | |
|---|---|---|
| 766,541 | 8/1904 | Spiegle . |
| 1,950,927 | 3/1934 | McMillan . |
| 2,248,538 | 7/1941 | Liebler . |
| 2,848,273 | 8/1958 | Diaz . |
| 4,138,154 | 2/1979 | McKeon |
| 4,222,601 | 9/1980 | White et al. ............ 296/37.16 |
| 4,480,675 | 11/1984 | Berkemeier ........... 296/37.16 X |
| 4,502,674 | 3/1985 | White et al. ............ 296/37.16 |
| 4,776,625 | 10/1988 | Labanoff et al. ........ 296/37.16 |
| 4,932,704 | 6/1990 | Ament ..................... 296/37.16 |
| 5,040,843 | 8/1991 | Russell et al. . |

FOREIGN PATENT DOCUMENTS

| 34446 | 2/1990 | Japan .................... 296/37.16 |
|---|---|---|

*Primary Examiner*—Johnny D. Cherry
*Assistant Examiner*—Joseph D. Pape
*Attorney, Agent, or Firm*—Harness, Dickey & Pierce

[57] ABSTRACT

The invention relates to a motor vehicle interior compartment security shade assembly. The device of this invention enables a security shade to be deployed to various extended positions in use. This capability allows the shade to cover portions of the motor vehicle interior cargo compartment while leaving other portions uncovered to accommodate large carried items. The plural park positions for the shade also eliminate the requirement of full retraction and extension each time the shade position is changed. The various embodiments describe alternate approaches toward providing the features of the invention. Including devices incorporating laterally extending tracks having diverging sections which provide stop position for the shade and other embodiments and another embodiment including an actuated ledge mechanism for the shade pull tube.

18 Claims, 3 Drawing Sheets

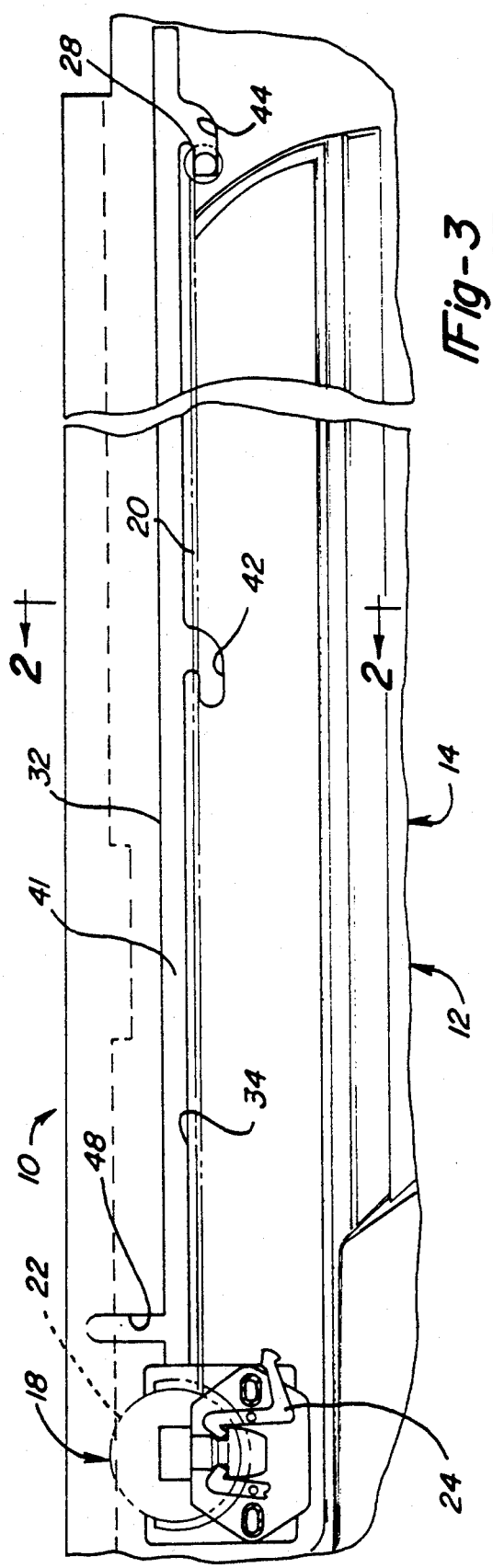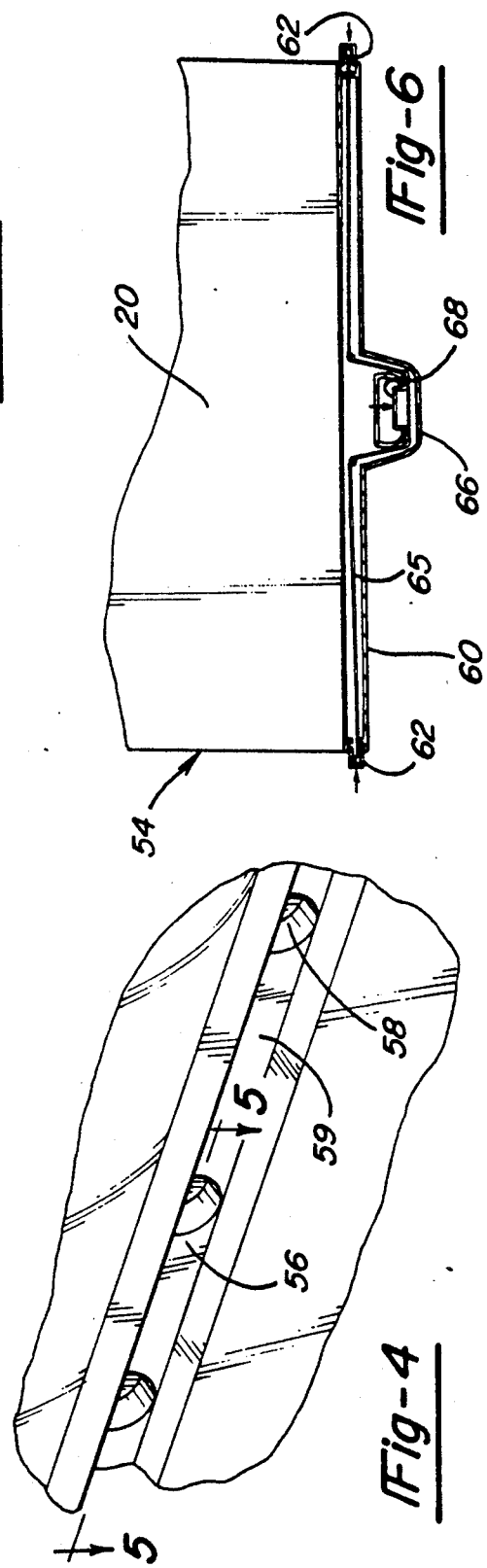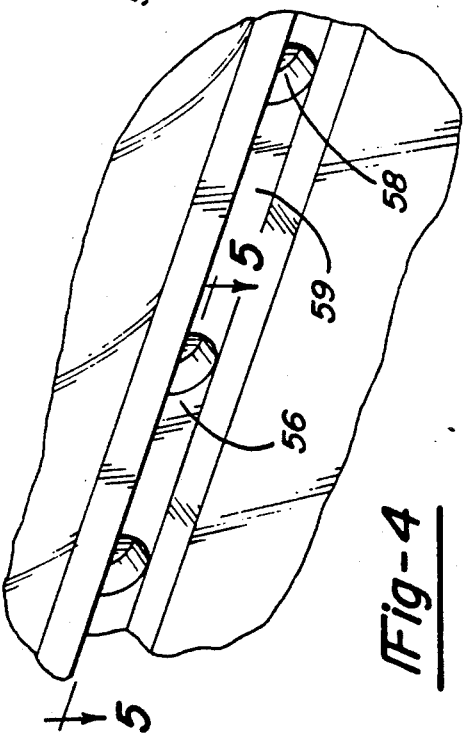

MOTOR VEHICLE SECURITY SHADE WITH GUIDE TRACK

BACKGROUND AND SUMMARY OF THE INVENTION

This invention relates to a roller type shade and particularly to one adapted for use in a motor vehicle for covering an interior rear compartment area of the vehicle.

In many styles of modern motor vehicles, a rear compartment area is provided for the storage of cargo or personal items. For enhanced security, motor vehicle manufacturers often provide a retractable shade panel which can be extended to cover the compartment area. Typically, such security shades are comprised of a roller tube mounted to a support structure in the vehicle with a flexible fabric panel wrapped onto the roller tube. The security shade panel can be extended to cover the compartment area or retracted onto the roller tube when it is not needed. Security shades typically also have means for conveniently enabling them to be removed or reinstalled in the vehicle. The edge of the fabric shade panel opposite the roller tube normally has a pull tube or stiffener. The pull tube may also have a handle to enable the shade panel to be conveniently withdrawn from the roller tube. A mechanism is employed to hold the pull tube in the extended position to maintain the cover over the compartment area. Clips or other fasteners are used at the opposite lateral edges of the pull tube to maintain it in the extended position. Vehicle security shades may be mounted such that the roller tube is positioned at the forward edge of the compartment area with the shade panel being drawn rearward to the extended position or mounted near the rear edge of the compartment area with the shade panel being drawn forward to the extended position adjacent to or attached to the rear seat back.

In conventional motor vehicle security shades, the user has no choice but to either have the shade panel fully retracted onto the roller tube or fully extended so that the pull tube/ end board is in the rearward parked position. This limitation can be an inconvenience especially where the compartment is deep when measured from the rear door of the vehicle. For such vehicles, the user must reach a long distance to grasp the pull tube to pull it to its extended position. A long reach is also required upon retracting the shade panel, since it is preferred to grasp the pull tube/end board until the shade panel is fully withdrawn so that the spring tension of the roller tube does not cause damage during an unrestrained windup of the shade. In addition, with current shade designs, if the user has items in the rearmost portion of the compartment area which would interfere with the shade panel, they do not have the option of partially extending the shade.

In view of the foregoing, the present invention provides a security shade assembly for a motor vehicle which incorporates a guide track for guiding the pull tube and includes more than one detent or park position for the roller tube. With the present invention, the user may choose to partially withdraw the shade panel to cover a portion of the rear compartment area. In this intermediate position, the operator can choose to more fully extend the shade panel without reaching to the forward mounting location of the shade roller tube assembly. The intermediate detent position also allows tall items to be placed in the rearmost portion of the compartment while the forward area of the compartment is covered by the partially extended shade panel.

This invention further entails various approaches toward providing multiple park positions for a security shade, including tracks having divergent track sections or attaching hooks for restraining the pull tube/ end board. An additional embodiment describes an actuated latching mechanism capable of providing a large number of park positions along the extended path of a pull tube.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 3 is a side view of the guide track shown in FIG. 1 particularly showing the sections of the track defining detent positions;

FIG. 4 is a pictorial view of the guide track of a security shade in accordance with a second embodiment of this invention.

FIG. 6 is a partial top view of the pull tube of the assembly shown in FIG. 4.

DETAILED DESCRIPTION OF THE INVENTION

Figure 1:
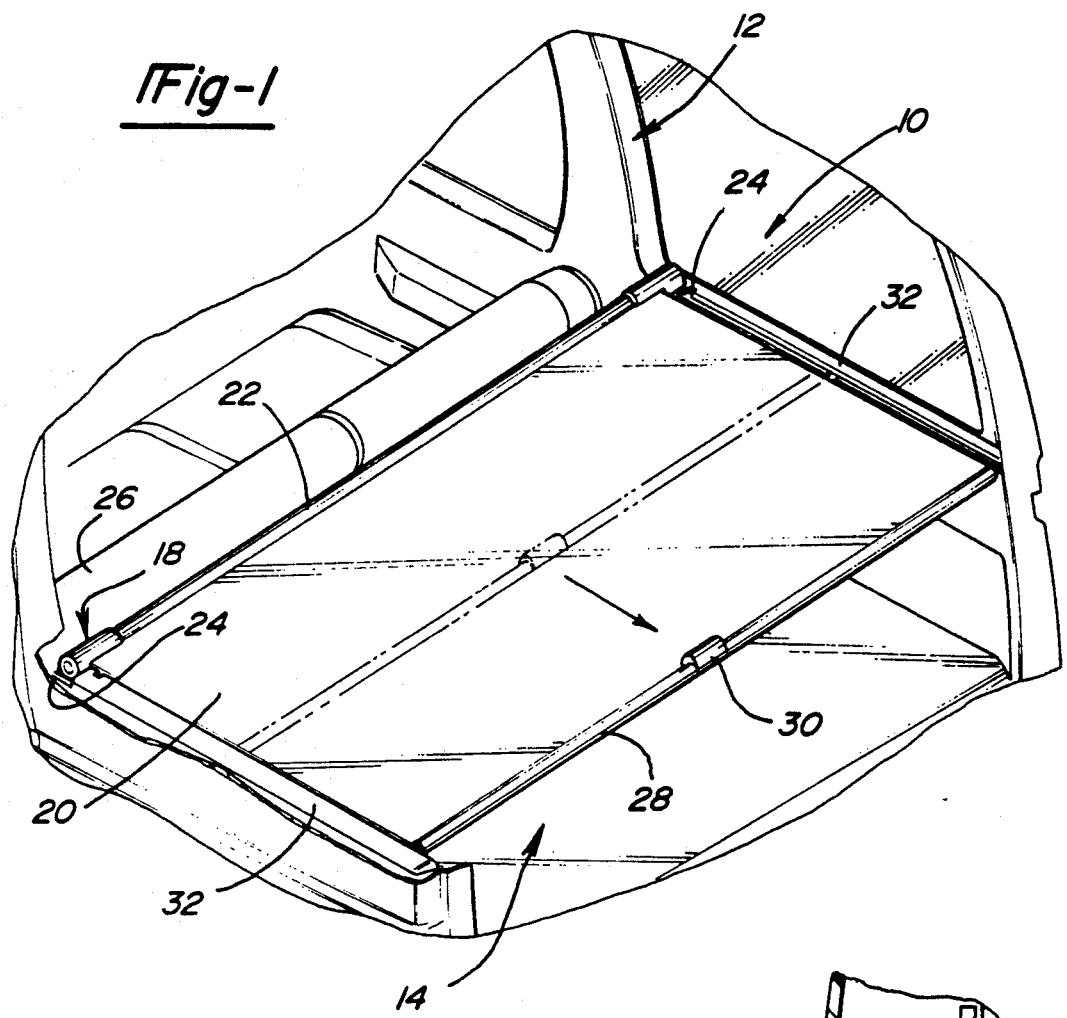
FIG. 1 is a pictorial view of a security shade in accordance with the first embodiment of this invention shown in a fully extended position.

A security shade assembly in accordance with the first embodiment of this invention is shown in FIG. 1, and is generally designed by reference number 10. Security shade assembly 10 is shown installed within a motor vehicle 12 and covering a rear compartment area 14. In the configuration shown in full lines in FIG. 1, the security shade is fully extended toward the rear of compartment area 14.

Security shade assembly 10 includes a roller tube assembly 18 having a hollow roller tube 22 upon which flexible fabric panel 20 is wrapped. Various designs for the roller tube assembly and fabric panel can be incorporated with this invention, including those described in Assignees commonly owned patents, U.S. Pat. Nos. 4,776,625; 4,502,674; 4,482,137; 4,222,601; and 4,139,231, which are hereby incorporated by reference. Roller tube 22 is rotationally biased to retract flexible fabric panel 20 onto the roller tube and to exert tension on the fabric when in the extended position. The ends of the roller tube assembly 18 are mounted to laterally displaced mounting brackets 24 in the vehicle interior. As shown in FIG. 1, mounting brackets 24 are positioned to maintain roller tube assembly 18 just behind a passenger seat back 26. Conventionally, roller tube assembly 18 can be removed from brackets 24 to enable the entire assembly to be removed from the vehicle. This is particularly desired in vehicles where passenger seat back 26 can be folded forward or completely removed. In such cases, it is desirable to remove security shade assembly 10, which would otherwise be an obstruction in the cargo area. The edge of flexible fabric panel 20 opposite roller tube 22 is fastened to a laterally extending pull tube 28. Flexible fabric panel 20 forms a pocket through which pull tube 28 is inserted. Pull tube 28 is shown having handle 30 at its center which facilitates extending and retracting shade panel 20.

Since retracting roller tube assembly 18 applies a rotational biasing force on roller tube 22 urging fabric panel 20 to be rolled onto the roller tube, a detent or restraining system is necessary to maintain the cover in the deployed condition shown in FIG. 1. In accordance with a first embodiment of this invention, such a feature is provided through specially designed guide tracks 32 which are mounted along the lateral sides of the rear compartment area 14 or, alternatively, integrated into trim panels.

Figure 2:
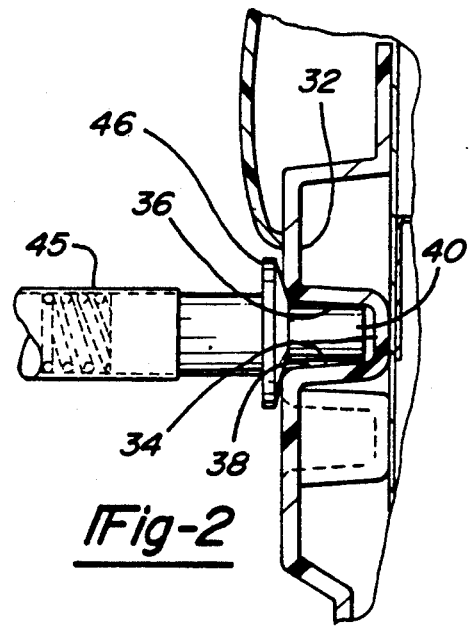
FIG. 2 is a cross-sectional view taken along line 2—2 of FIG. 3 particularly showing the interaction between the pull tube and the guide track of the system of FIG. 1.

Specific reference is made to FIGS. 2 and 3 for a description of guide tracks 32. Guide tracks 32 are preferably formed of a polymeric material which defines an indented channel 34 having side walls 36 and 38. Guide tracks 32 can be separately formed members or can be integrated into other elements of the vehicle interior. At the lateral ends of pull tube 28, caps 40 are provided which ride in channels 34 as best shown in FIG. 2. Track channel 34 has a main section 41 which is generally straight and extends from roller tube assembly 18 to the rearmost end of guide tracks 32. As fabric panel 20 is moved between its deployed and extended positions, pull tube caps 40 ride in main channel section 41.

In addition to the main channel section 41, guide track 32 further has a pair of diverging channel sections 42 and 44. As shown, these diverging channel sections first extend downward from the main channel section 41 and then are turned toward roller tube assembly 18. These diverging channel sections 42 and 44 enable pull tube 28 to be maintained in two distinct park or detent positions, one at the location of diverging section 42 which is between the fully retracted and fully extended position of fabric panel 20, and a fully extended position at diverging section 44. FIG. 1 illustrates in phantom lines the intermediate park position. In FIG. 3, pull tube 28 is shown parked in diverging section 44 corresponding to the fully extended position. Due to the rotational biasing applied on the roller tube 22, the diverging channel sections 44 maintain the pull tube in either of the parked positions. As is readily apparent from this disclosure of the invention, a number of additional diverging sections, like 42 and 44, could be provided along channels 34 which would each define discrete positions where pull tube 28 can be maintained.

By providing a number of park positions for pull tube 28, the flexibility of use of security shade assembly 10 is enhanced. Panel 20 can be retracted to its partially extended position at diverging section 42 without retracting it fully to the roller tube assembly, thus avoiding the need for a long reach by the user. In addition, when tall items such as grocery bags or other articles are carried in the rearmost portion of rear compartment area 14, the fabric panel can be partially extended so that other articles at the forward end of the rear compartment can be covered.

Since some lateral tolerance variations can be expected in the vehicle and/or in guide tracks 32, in some applications it may be desirable to provide one or both of pull tube caps 40 with a spring biasing or telescoping feature as designated by coil spring 45. Accordingly, the caps 40 would be biased so that its flared flange 46 will be maintained in contact with guide tracks 32. Spring biasing will also reduce the tendency for rattling caused by road vibrations.

Various approaches toward removing pull tube 28 from guide tracks 32 can be implemented. In one approach, spring biased end caps 40 are provided as described previously. For that design, a sufficient range of motion would be provided to allow one or both of the end caps to be completely disengaged from guide track 32. Alternatively, an "escape" channel section 48 can be provided as shown in FIG. 3 adjacent to roller tube assembly 18. The end caps 40 can be disengaged entirely from the guide tracks 32 through escape channel section 48 allowing roller tube assembly 18 to be removed completely from the vehicle.

Figure 5:
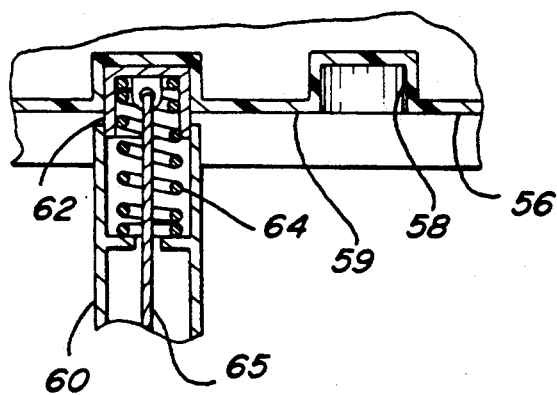
FIG. 5 is a cross-sectional view taken along line 5—5 of FIG. 4 showing the pull tube as it interacts with pockets in the guide track channel.

A security shade assembly in accordance with the second embodiment is shown in FIGS. 4, 5 and 6 and is designated by reference number 54. Since a number of elements of this embodiment are identical to those described previously, they are identified by like reference numbers. For this embodiment, guide tracks 56 feature a plurality of pockets 58 which are spaced along guide track channel 59. With this embodiment, a pull tube 60 is used having retractable end caps 62. The user can position the pull tube 60 at a variety of extended or partially extended positions by causing end caps 62 to interengage with a pair of opposed pockets 58. End caps 62 are biased in an outward direction by coil spring 64. A convenient actuation mechanism for pull tube end caps 62 is shown in FIGS. 5 and 6. Cable 65 is provided having ends attached to both opposed end caps 62. Cable 65 is routed to pass through handle 66 so that an actuation trigger or release 68 can be engaged by the user and squeezed to pull both end caps 62 to retract within pull tube 60. This causes the end caps to be retracted enabling the pull tube to be repositioned along guide track 56.

Figure 7:
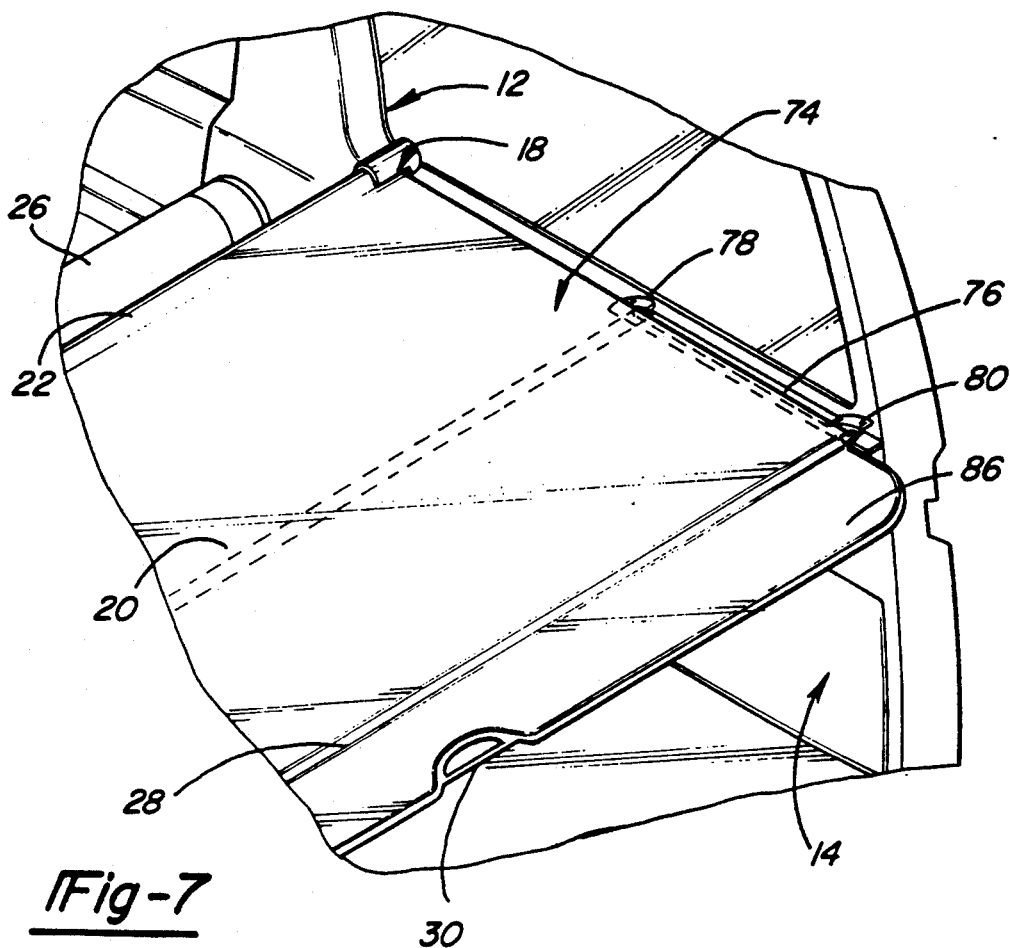
FIG. 7 is a pictorial view of a security shade assembly in accordance with a third embodiment of this invention incorporating a partial track assembly defining plural detent or park positions.
Figure 8:
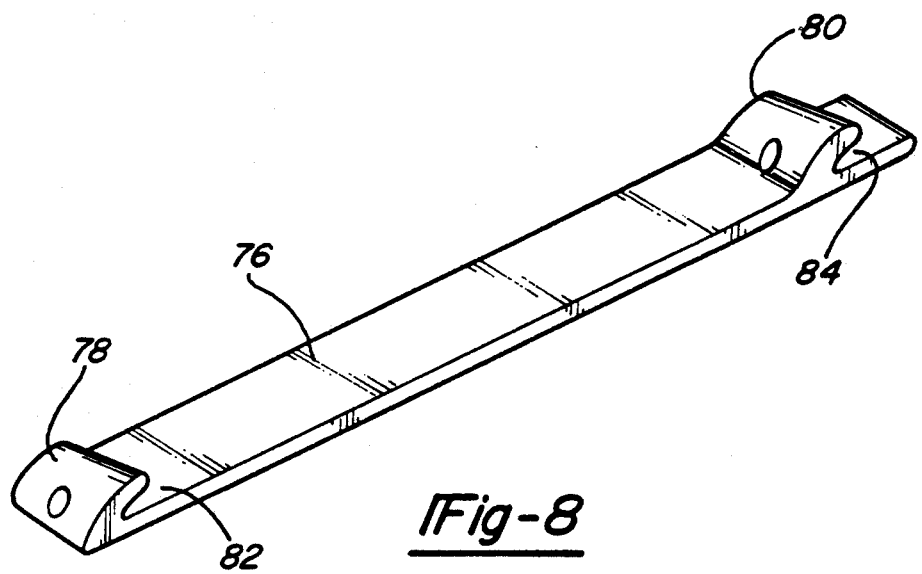
FIG. 8 is a pictorial view of the track member shown in FIG. 7.

A third embodiment of the security shade assembly according to this invention is shown in FIGS. 7 and 8 and is generally designated by reference number 74. Security shade assembly 74 is very similar to shade assembly 10 but includes a guide track 76 having an "open channel" configuration. As shown, guide track 76 is mounted along the lateral sides of the vehicle at the rearmost portion of the rear compartment area 14. Guide tracks 76 includes a pair of rearward projecting flanges 78 and 80 which define pockets 82 and 84, respectively. As is evident in light of the prior descriptions of this invention, these pockets 82 and 84 can be used to restrain pull tube 28 at a pair of displaced positions from a partially extended to a fully extended position as shown in FIG. 7. The embodiment of FIG. 7 further illustrates the use of a filler panel 86 extending rearwardly from pull tube 28 which is used to cover any open area between the pull tube and the rear cargo door in some applications.

While the above description constitutes the preferred embodiments of the present invention, it will be appreciated that the invention is susceptible to modification, variation and change without departing from the proper scope and fair meaning of the accompanying claims.

We claim:

1. A retractable security shade assembly for a motor vehicle interior compartment comprising:
   a flexible shade panel;
   a roller tube affixed to a first edge of said shade panel;
   roller tube support means for rotationally biasing said roller tube to allow said shade panel to wrap onto said roller tube during retraction and unwrap from said roller tube during extension, and having mounting means for enabling said roller tube support means to be mounted within said motor vehicle interior compartment;
   pull tube means affixed to a second edge of said shade panel opposite said first edge for stiffening said second edge, said pull tube means having laterally extending ends; and
   at least two detent means mounted within said motor vehicle interior compartment adjacent the lateral side edges of said shade panel including a channel engageable with said pull tube ends, said channel comprising an open end receiving said pull tube end and a blind end extending from said open end in the direction of said roller tube for retaining said pull tube in an extended position, enabling said pull tube to be maintained in a first position with said shade panel partially extended from said roller tube, or maintained in a second position with said shade panel more fully extended from said roller tube.

2. A retractable security shade assembly of claim 1 wherein said detent means includes a closed channel receiving said pull tube end and having a first section extending along said compartment and a second section diverging from said first section for maintaining said pull tube in said first position and a third section diverging from said first section for retaining said pull tube in said second position.

3. A retractable security shade assembly of claim 2 wherein at least one of said second and third channel sections define blind ended channels which initially divert from said first channel section and turn to extend toward said roller tube at their blind end.

4. A retractable security shade assembly of claim 2 further comprising a fourth channel section for enabling said pull tube to be removed from said detent means.

5. A retractable security shade assembly of claim 2 wherein one or both of said pull tube ends includes an end cap biased toward an extended position from said pull tube and retractable for enabling said pull tube to be positioned into and removed from said closed channel.

6. A retractable security shade assembly of claim 1 wherein said roller tube and said roller tube mounting means are mounted within said motor vehicle interior compartment such that said roller tube extends laterally along a forward extent of said compartment and said pull tube is extended rearwardly toward the rear of said compartment.

7. A retractable security shade assembly of claim 6 wherein said first position of said pull tube is approximately one-half the distance toward said rear of said compartment from said roller tube and said second position is substantially at said rear of said compartment.

8. A retractable security shade assembly of claim 1 wherein each of said detent means comprises at least one hook spaced along said compartment for engaging said pull tube at said first and second positions.

9. A retractable security shade assembly of claim 1 wherein said mounting means allows said roller tube to be removed from said motor vehicle interior compartment.

10. A retractable security shade assembly for a motor vehicle interior compartment comprising:
    a flexible shade panel;
    a roller tube affixed to a first edge of said shade panel;
    roller tube support means for rotationally biasing said roller tube to allow said shade panel to wrap onto said roller tube during retraction and unwrap from said roller tube during extension, and having mounting means for enabling said roller tube support means to be mounted within said motor vehicle interior compartment and permitting said roller tube and said shade panel to be removed from said motor vehicle interior compartment;
    pull tube means affixed to a second edge of said shade panel opposite said first edge for stiffening said second edge, said pull tube means having laterally extending ends;
    end caps extending from said pull tube ends and having biasing means urging at least one of said end caps toward an extended position from said pull tube means and being displacable toward the other of said end caps; and
    track means mounted to said motor vehicle compartment adjacent lateral side edges of said shade panel having a channel which receives said end caps, said channel having a first section extending along said compartment and a second section diverging from said first section defining a first detent position for maintaining said shade panel at a partially extended position from said roller tube and having a third section diverging from said first section defining a second detent position for maintaining said shade panel at a more fully extended position from said roller tube.

11. A retractable security shade assembly of claim 10 wherein at least one of said second and third channel sections define blind ended channels which initially divert from said first channel section and turn to extend toward said roller tube at their blind end.

12. A retractable security shade assembly of claim 10 further comprising a fourth track section for enabling said pull tube to be removed from said track means.

13. A retractable security shade assembly of claim 10 wherein said roller tube and said roller tube mounting means are mounted to said motor vehicle interior compartment such that said roller tube extends laterally along a forward extent of said compartment and said pull tube means is extended rearwardly toward the rear of said compartment.

14. A retractable security shade assembly of claim 13 wherein said first position of said pull tube means is approximately one-half the distance toward said rear of said compartment from said roller tube and said second position is substantially at said rear of said compartment.

15. A retractable security shade assembly for a motor vehicle interior compartment comprising:
    a flexible shade panel;
    a roller tube affixed to a first edge of said shade panel;
    roller tube support means for rotationally biasing said roller tube to allow said shade panel to wrap onto said roller tube during retraction and unwrap from said roller tube during extension, and having mounting means for enabling said roller tube support means to be mounted within said motor vehicle interior compartment;

pull tube means affixed to a second edge of said shade panel opposite said first edge for stiffening said second edge, said pull tube means having laterally extending ends; and a track means including a channel receiving said pull tube ends and having a first section extending along said compartment and a second section diverging from said first section and defining a detent for maintaining said pull tube means in said first position and a third section diverting from said first section and defining a detent for retaining said pull tube means in said second position where at least one of said second and third channel sections define blind ended channels which initially divert from said first channel section and turn to extend toward said roller tube at their blind end, said track means mounted within said motor vehicle interior compartment adjacent the lateral side edges of said shade panel and engageable with said pull tube ends, said track means having at least two detent means for enabling said pull tube means to be maintained in a first position with said shade panel partially extended from said roller tube, or maintained in a second position with said shade panel more fully extended from said roller tube.

16. A retractable security shade assembly for a motor vehicle interior compartment comprising:

a flexible shade panel;

a roller tube affixed to a first edge of said shade panel;

roller tube support means for rotationally biasing said roller tube to allow said shade panel to wrap onto said roller tube during retraction and unwrap from said roller tube during extension, and having mounting means for enabling said roller tube support means to be mounted within said motor vehicle interior compartment;

pull tube means affixed to a second edge of said shade panel opposite said first edge for stiffening said second edge, said pull tube means having laterally extending ends;

track means mounted within said motor vehicle interior compartment adjacent lateral side edges of said shade panel and engageable with said pull tube ends, said track means having at least two detent means for enabling said pull tube means to be maintained in a first position with said shade panel partially extended from said roller tube, or maintained in a second position with said shade panel more fully extended from said roller tube; and end caps attached to one or both of said tube ends biased toward an extended position from said pull tube means and retractable for enabling said pull tube means to be positioned into and removed from said track means.

17. A retractable security shade assembly for a motor vehicle interior compartment comprising:

a flexible shade panel;

a roller tube affixed to a first edge of said shade panel;

roller tube support means for rotationally biasing said roller tube to allow said shade panel to wrap onto said roller tube during retraction and unwrap from said roller tube during extension, and having mounting means for enabling said roller tube support means to be mounted within said motor vehicle interior compartment;

pull tube means affixed to a second edge of said shade panel opposite said first edge for stiffening said second edge, said pull tube means having laterally extending ends; and at least two detent means mounted within said motor vehicle interior compartment adjacent the lateral side edges of said shade panel including a closed channel engageable with said pull tube ends, wherein said channel extends along the path of the extension of said pull tube means and said channel defines at least two pockets whereat said channel is locally deeper, said pockets receiving said pull tube ends, enabling said pull tube means to be maintained in a first position with said shade panel partially extended from said roller tube, or maintained in a second position with said shade panel more fully extended from said roller tube.

18. A retractable security shade assembly of claim 17 wherein each of said detent means comprises at least one hook spaced along said compartment for engaging said pull tube means at said first and second positions.

* * * * *

UNITED STATES PATENT AND TRADEMARK OFFICE
CERTIFICATE OF CORRECTION

PATENT NO. : 5,224,748

DATED : July 6, 1993

INVENTOR(S) : John H. Decker, Joseph R. Finn, Joseph P. Wieczorek, and Eugene M. Halajian It is certified that error appears in the above-identified patent and that said Letters Patent is hereby corrected as shown below:

Column 7, line 46, Claim 16, after "adjacent" please insert --the--.

Column 8, line 8, Claim 16, after "said" insert --pull--.

Signed and Sealed this

Fifteenth Day of March, 1994

Attest:

BRUCE LEHMAN

Attesting Officer     Commissioner of Patents and Trademarks